R. S. GILKESON.
ATTACHMENT FOR CHILDREN'S VEHICLES.
APPLICATION FILED APR. 23, 1909.
1,023,467.
Patented Apr. 16, 1912.
3 SHEETS—SHEET 1.
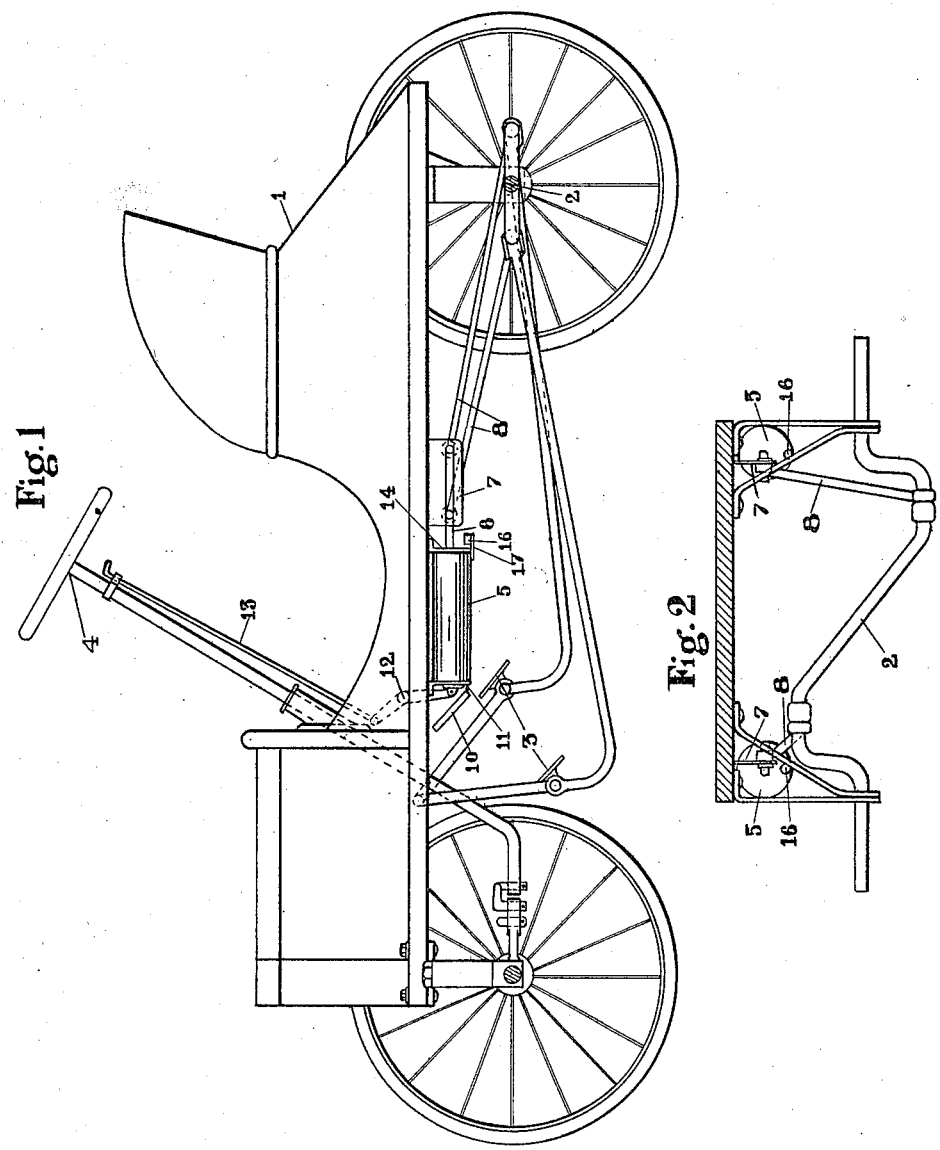
WITNESSES:
A. M. Shannon.
A. M. Dorr.
INVENTOR
Rush S. Gilkeson.
BY
ATTORNEYS
COLUMBIA PLANOGRAPH CO., WASHINGTON, D. C.

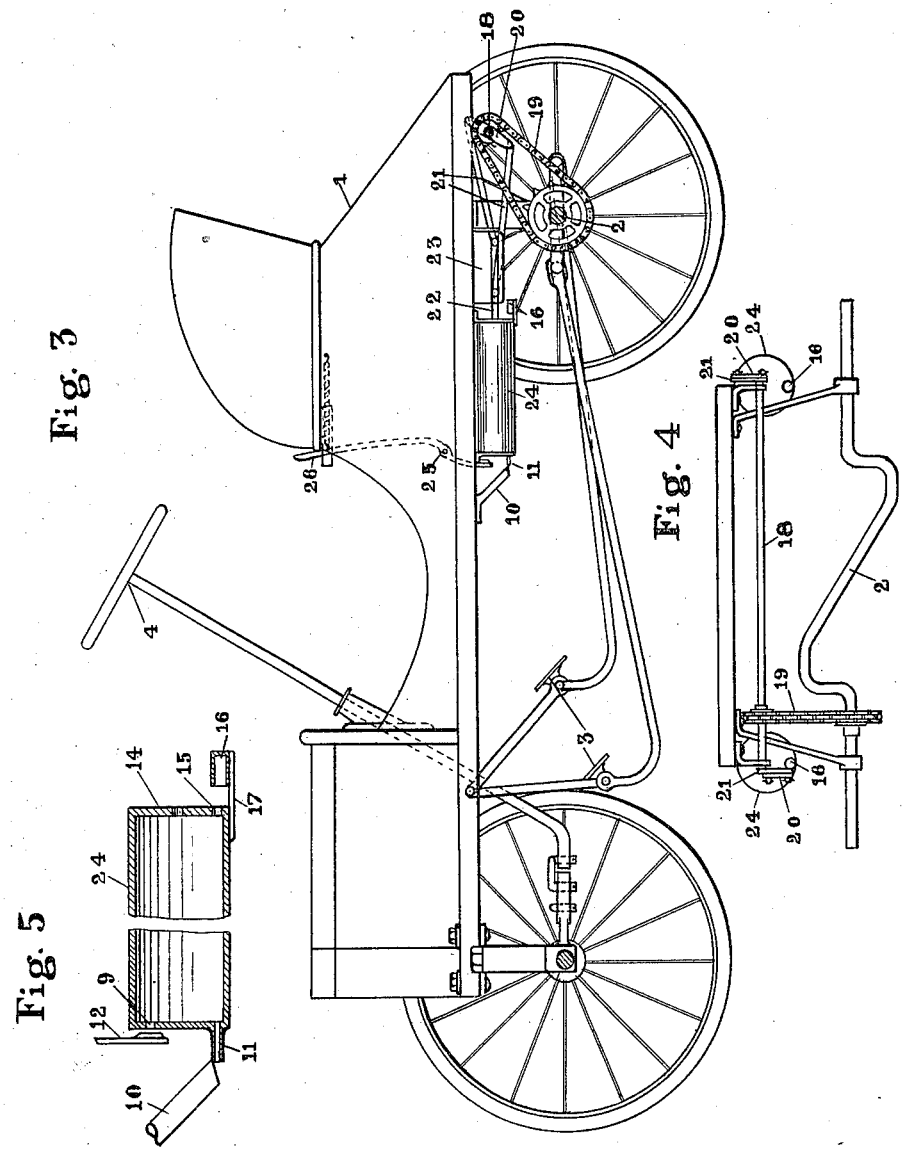

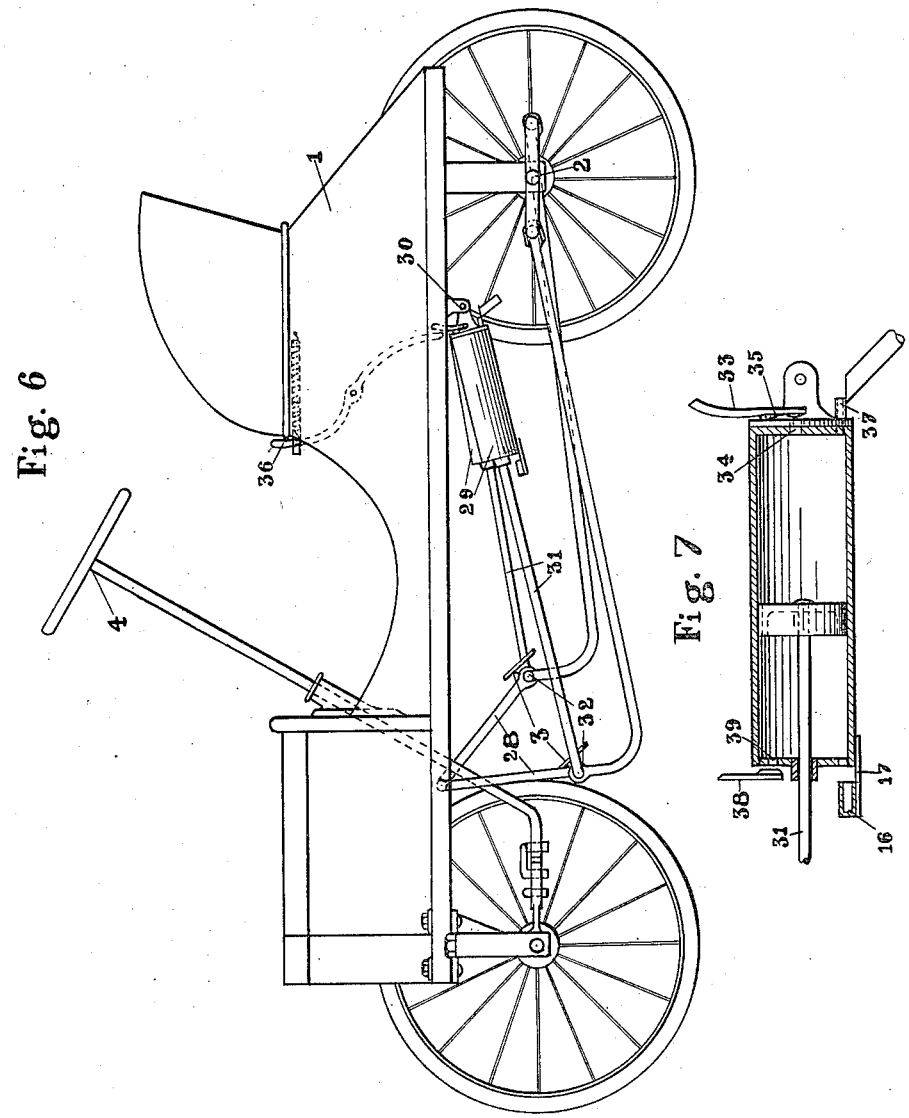

UNITED STATES PATENT OFFICE.

RUSH S. GILKESON, OF DETROIT, MICHIGAN.

ATTACHMENT FOR CHILDREN'S VEHICLES.

1,023,467.  Specification of Letters Patent.  Patented Apr. 16, 1912.

Application filed April 23, 1909. Serial No. 491,759.

*To all whom it may concern:*

Be it known that I, RUSH S. GILKESON, a citizen of the United States of America, residing at Detroit, in the county of Wayne and State of Michigan, have invented certain new and useful Improvements in Attachments for Children's Vehicles, of which the following is a specification, reference being had therein to the accompanying drawings.

This invention relates to an arrangement for children's velocipedes, automobiles or like toys adapted to be propelled by foot pedals, whereby the exhaust of an automobile is imitated and a whistle provided.

The invention consists in the matters hereinafter set forth, and more particularly pointed out in the appended claims.

In the drawings, Figure 1 is a view in side elevation of a child's automobile provided with an attachment embodying features of the invention. Fig. 2 is a view in detail of the device looking at the rear end thereof. Fig. 3 is a view showing a modification of the device. Fig. 4 is a view in detail of the modification. Fig. 5 is a view in detail of a cylinder and attachments. Figs. 6 and 7 are views in detail of another modification.

Referring to the drawings, a child's vehicle 1 herein shown as an imitation of an automobile and propelled from the rear axle 2 by pedals 3, has a steering post and wheel 4. A pair of compression cylinders 5 are secured beneath the body of the vehicle. Each cylinder is provided with a piston whose stem 6 is adapted at its outer end to slide in the groove of a guide plate 7 and is coupled by a connecting rod 8 with the rear crank axle 2 which thereby reciprocates the piston. A small relief opening 9 is formed in the outer end of one cylinder and a whistle 10, which may be of any preferred type but is herein shown in the shape of a cartridge or bird call whistle, has its mouth piece 11 secured in a suitable aperture in the cylinder head. A lever 12 whose padded end opposes the relief port 9 is adapted, when depressed by means of a suitably disposed hand rod 13 on the steering post 4, to close the exhaust opening 9, thus forcing the air in the cylinder through the whistle mouth piece 11 and producing the desired sound. At the other end of the cylinder, the head 14 has an aperture 15 with a hollow cap 16 secured on the outside of the head by a bracket 17 opposing the opening 15 so that escaping air strikes it and produces a sound resembling the exhaust of an automobile.

As a modification shown in Figs. 3 and 4, a countershaft 18 is journaled beneath the body of a vehicle near the rear end thereof and has a wheel-and-sprocket connection 19 with the main crank shaft. Crank arms 20 on this countershaft are connected by rods 21 to piston stems 22 whose outer ends travel in slots in guide plates 23 and whose inner ends carry pistons for cylinders 24 secured under the body, both provided, as before, with exhaust caps 16 and one with an opening 9 and a whistle 10. The disposition of a relief closing or whistle-sounding lever 25 in this construction brings its handle 26 adjacent the vehicle seat instead of on the steering post.

Where a vehicle is propelled by a pair of pedals (Figs. 6 and 7) hung on depending arms 28 so that they swing in a vertical plane, the connections may be made directly thereto, the cylinders 29 being pivoted at the rear ends to lugs 30 on the body, and the forward heads oscillating with the piston stems 31 whose outer ends are pivoted on the pins 32 carrying the pedals. In this construction, a short finger 33 is held open over a relief aperture 34 in the rear head by the spring 35, and is operated by a hand lever 36 to close the opening and force the air through a whistle mouthpiece 37. By this arrangement novel features are added to the toys which enhance their market value and make them more acceptable to the trade.

Obviously, changes in the details of construction may be made without departing from the spirit of the invention, and I do not care to limit myself to any particular form or arrangement of parts. There may also be a relief valve and opening on the exhaust end of the cylinder, and such construction is shown in Fig. 7, a lever 38 and relief aperture 39 being placed as indicated.

What I claim as my invention is:—

1. The combination with a child's vehicle and propelling mechanism therefor, of a cylinder adapted to be secured thereon having a head provided with a relief port, a whistle whose mouthpiece opens through said head, means within manual control of the vehicle's occupant for closing the relief port in the head momentarily, a cap secured on the other cylinder head at an interval from and in axial alinement with an aperture in the head, a piston in the cylinder and means to reciprocate the piston.

2. The combination with a child's vehicle and propelling mechanism therefor, of a cylinder adapted to be secured thereon, having a head provided with a relief port, a whistle whose mouthpiece opens through said head, a lever pivoted on the vehicle body one of whose ends is adapted to close the relief port, a handle for operating the lever, a cap secured on the other cylinder head at an interval from and in axial alinement with an aperture in the head, a piston in the cylinder, and means to reciprocate the piston.

3. The combination with a child's vehicle and propelling mechanism therefor, of a cylinder adapted to be secured thereon, having a head provided with a relief port, a whistle whose mouthpiece opens through said head and forms a support for the whistle, means within manual control of the vehicle's occupant for closing the relief port in the head momentarily, a cap secured on the other cylinder head at an interval from and in alinement with an aperture in the head, a guide plate, a piston in the cylinder, piston stem therefor in sliding engagement with the guide plate and means operatively connecting the stem to the vehicle driving mechanism.

4. The combination with a child's vehicle and propelling mechanism therefor, of a cylinder adapted to be secured thereon, having a head provided with a relief port, a whistle whose mouthpiece opens through said head and forms a support for the whistle, means within manual control of the vehicle's occupant for closing the relief port in the head momentarily, a cap secured on the other cylinder head at an interval from and in axial alinement with an aperture in the head, a guide plate, a piston in the cylinder, a piston stem therefor in sliding engagement with the guide plate and means operatively connecting the stem with the vehicle driving mechanism.

5. The combination with a child's vehicle and propelling mechanism therefor, of a cylinder adapted to be secured thereon, having a head provided with a relief port, a whistle whose mouthpiece opens through said head and forms a support for the whistle, a lever pivoted on the vehicle body one of whose ends is adapted to close the relief port, a handle for operating the lever, a cap secured on the other cylinder head at an interval from and in axial alinement with an aperture in the head, a guide plate, a piston in the cylinder, a piston stem in sliding engagement with the guide plate and means operatively connecting the stem with the vehicle driving mechanism.

6. The combination with a child's vehicle, of a cylinder adapted to be secured thereon having a head provided with a relief port, a whistle whose mouthpiece opens through said head, means within manual control of the vehicle's occupant for closing the relief port in the head momentarily, a cap secured on the other cylinder head at an interval from and in axial alinement with an aperture in the head, a piston in the cylinder, propelling means for the vehicle and connections between said means and the piston adapted to operate the latter.

7. The combination with a child's vehicle, of a cylinder adapted to be secured thereon having a head provided with a relief port, a whistle whose mouthpiece opens through said head, means within manual control of the vehicle's occupant for closing the relief port in the head momentarily, a cap secured on the other cylinder head at an interval from and in axial alinement with an aperture in the head, a piston in the cylinder, oscillating pedals for propelling the vehicle, and operative connections between the pedals and piston adapted to reciprocate the latter.

8. The combination with a child's vehicle and propelling mechanism therefor, of a cylinder adapted to be secured thereon, having a head provided with a relief port, a whistle whose mouth piece opens through said head, means within manual control of the vehicle's occupant for closing the relief port, means at an interval from and in axial alinement with an aperture in the other cylinder head whereby a hissing sound is produced, a piston in the cylinders and means to reciprocate said pistons.

9. The combination with a child's vehicle and propelling mechanism therefor, of a cylinder having a head provided with a relief port, a whistle opening through said head, means within manual control of the vehicle's occupant for closing the relief port, a cap at an interval from the other cylinder head and in alinement with an aperture in said head, a guide plate, a piston in the cylinder, a piston stem therefor in sliding engagement with the guide plate, a connecting rod coupled with the stem and a crank driven by the vehicle driving wheels connected to said rod.

10. The combination with a child's vehicle and propelling mechanism therefor, of a cylinder having a head provided with a relief port, a whistle opening through said head, means within manual control of the vehicle's occupant for closing the relief port, a cap secured on the other cylinder head at an interval from and in alinement with an aperture in said head, a guide plate, a piston in the cylinder, a piston stem therefor in sliding engagement with the guide plate, a connecting rod coupled to the stem, a countershaft having a crank connected to the rod and a wheel-and-sprocket connection between the countershaft and the vehicle driving mechanism.

11. The combination with a child's vehicle and propelling mechanism therefor, of a cylinder adapted to be secured thereon, having a head provided with a relief port, a whistle whose mouth piece opens through said head, a lever pivoted on the vehicle body adapted to close the relief port, a cap secured on the other cylinder head at an interval from and in alinement with an aperture in said head, a guide plate, a piston in the cylinder having a stem, a connecting rod coupled to the stem, a countershaft having a crank connected to the rod, and a wheel-and-sprocket connection between the countershaft and the vehicle driving mechanism.

In testimony whereof I affix my signature in presence of two witnesses.

RUSH S. GILKESON.

Witnesses:
ANNA M. DORR,
ANNA M. SHANNON.

Copies of this patent may be obtained for five cents each, by addressing the "Commissioner of Patents, Washington, D. C."